Figure 3:
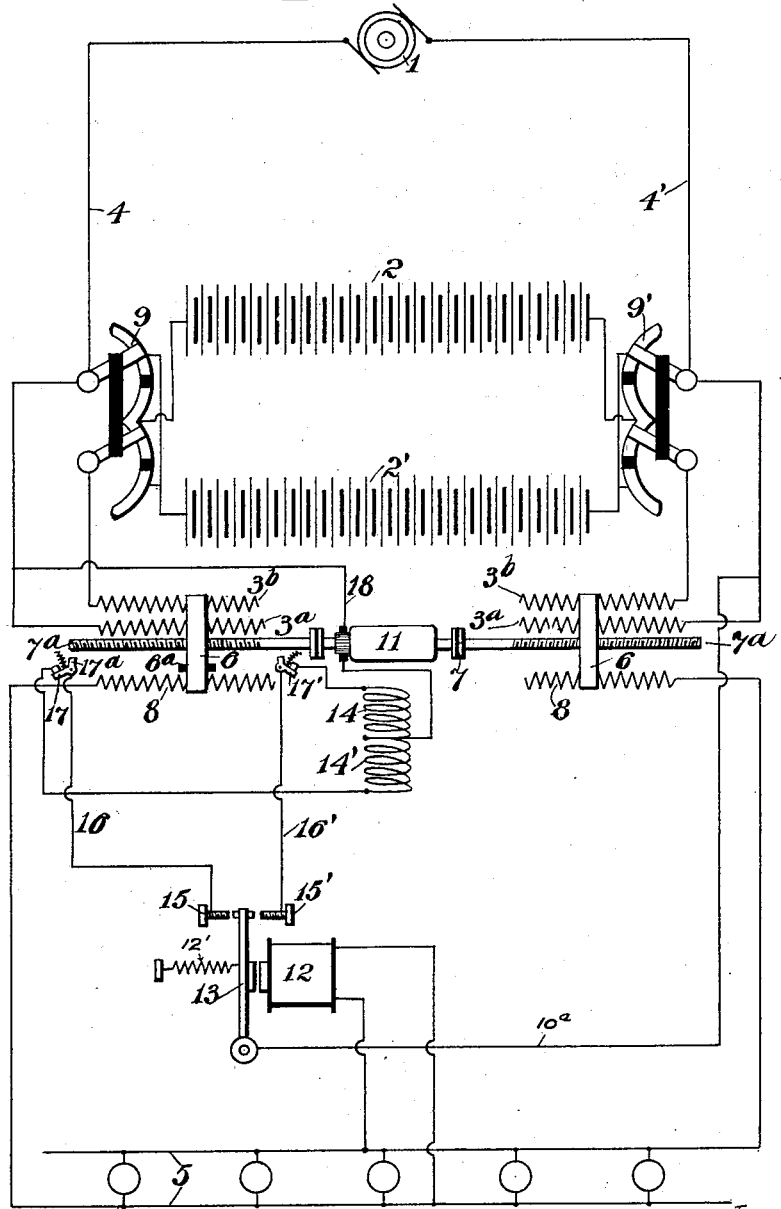

No. 720,351. PATENTED FEB. 10, 1903.
A. S. HUBBARD.
SYSTEM OF DISTRIBUTION.
APPLICATION FILED JAN. 14, 1902.
NO MODEL. 2 SHEETS—SHEET 1.
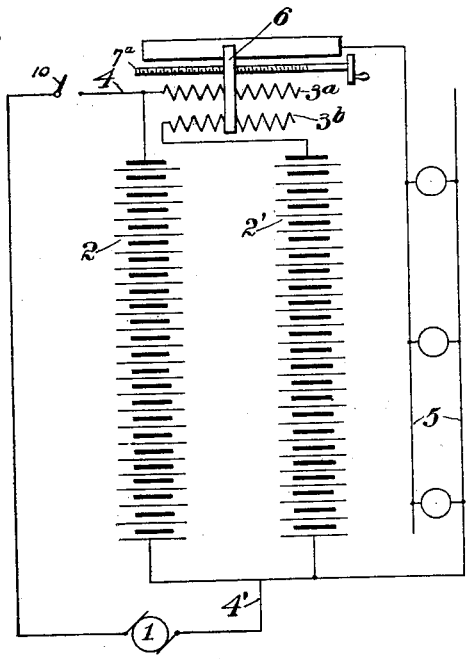
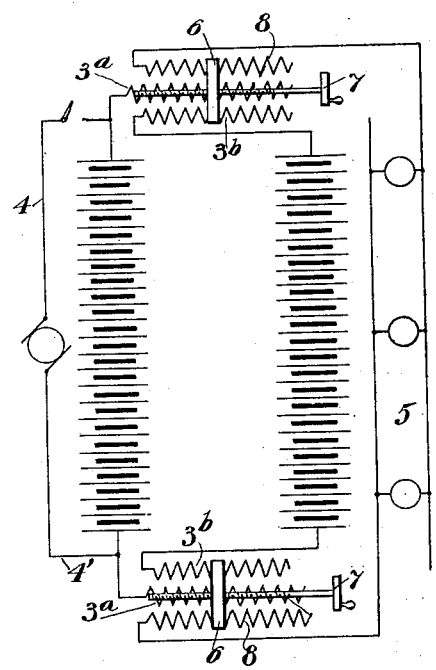

No. 720,351. PATENTED FEB. 10, 1903.
A. S. HUBBARD.
SYSTEM OF DISTRIBUTION.
APPLICATION FILED JAN. 14, 1902.
NO MODEL. 2 SHEETS—SHEET 2.

UNITED STATES PATENT OFFICE.

ALBERT S. HUBBARD, OF GREENWICH, CONNECTICUT, ASSIGNOR TO CHARLES M. GOULD, OF BAYSIDE, LONG ISLAND, NEW YORK.

SYSTEM OF DISTRIBUTION.

SPECIFICATION forming part of Letters Patent No. 720,351, dated February 10, 1903.

Application filed January 14, 1902. Serial No. 89,715. (No model.)

*To all whom it may concern:*

Be it known that I, ALBERT S. HUBBARD, a citizen of the United States, residing at Greenwich, in the county of Fairfield and State of Connecticut, have invented certain new and useful Improvements in Systems of Distribution, of which the following is a specification.

This invention relates to improvements in systems of distribution, and particularly to a system wherein a plurality of storage batteries are connected in parallel to a generator or charging-circuit and to a consumption-circuit, with a resistance or electromotive-force reducer between the charging-circuit and the batteries, this resistance being so connected with the batteries and consumption-circuit that it may be increased or decreased by the same amount to each battery simultaneously and that when the generator is cut out each battery feeds to the line directly.

According to my invention the resistance between the batteries is divided, and a rheostatic switch is arranged to cut out resistance in both halves of the resistance simultaneously. One advantage of this is that a greater variation can be secured in a given movement; but the principal advantage is that when the dynamo is cut out and the system is running on batteries alone the batteries are directly connected without intervening resistance, thereby tending to equalize them and giving equal delivery from each to the working circuit. In order to further regulate the potential in the working circuit, another resistance may be included in the connection thereto, and this may be controlled by the same or a different rheostatic switch.

In the accompanying drawings, Figure 1 is a diagram of a system of distribution embodying my invention, showing a manually-operated switch for controlling the resistance connection. Fig. 2 is a similar view showing the supplementary resistance in the translating-circuit connection and also showing duplication of the switch on the two sides of the circuit. Fig. 3 shows the application of automatic controlling means to the system.

Referring to Fig. 1, the generator is indicated at 1 and the two storage batteries at 2 2' and the intervening divided resistance at $3^a\ 3^b$, the storage batteries being connected to the charging-circuit wires 4 4' in parallel, so that the generator is connected to battery 2 directly and to battery 2' through divided resistance $3^a\ 3^b$. Consequently the electromotive force impressed from the generator on the battery 2' is less than that on the battery 2 by an amount depending on the drop in the resistance $3^a\ 3^b$. The two parts $3^a\ 3^b$ of the divided resistance are connected, respectively, to the charging-circuit wire 4 and to the storage battery 2'. The consumption or load circuit (indicated at 5) is connected at one side to the generator and the common return of the batteries and on the other side to a switch 6, whose movable part or contact is adapted to engage suitable contacts to connect different parts of the resistance $3^a\ 3^b$, according to the position of said switch. The switch has a handle 7, whereby its position may be adjusted so as to maintain a desired condition of potential on the translating-circuit, this handle operating the switch in the form shown by a screw $7^a$, working in the switch-contact, which acts as a nut thereon. Thus if more lights are switched into said circuit the attendant will note the fall in intensity due to increased drop in the circuit and will move switch 6 so that its contact will approach the higher-potential end of resistance $3^a\ 3^b$. This causes a higher electromotive force to be delivered to the circuit 5 to make up for increased drop.

It will be seen that the connections from dynamo 1 and battery 2' are both made at the same end of the rheostatic switch device 6 $3^a\ 3^b$, so that as the switch-contact 6 is moved toward that end it simultaneously cuts out resistance from the generator connection and from the battery connection, thus doubling the effect. Moreover, when the switch-contact is moved clear over it acts to cut out all the resistance in both of these connections, and this condition is very desirable when the dynamo is disconnected in opening the main switch 10, so as to allow the system to run under the battery-power alone. Under such circumstances if either of the batteries is so fully discharged as to be of lower potential than the other it will receive current therefor without loss in resistance, and the two batteries will become equalized. The discharge into the working circuit will also be equally distributed between the two batteries.

In Fig. 2 the switch 6 is shown as coöperating with another rheostat or resistance 8, included in the connection of circuit 5, in such manner that when the switch is moved to a point of higher potential on resistance 3ª the resistance of the connection to circuit 5 will be decreased, so as to increase the regulating effect. The resistance-switches are also here shown as duplicated on the two sides of the circuit.

In some cases it is desirable to render the operation of the regulating device automatic, and for this purpose I arrange the system as shown in Fig. 3, wherein the resistance-switches 3ª 3ᵇ 6 8 are arranged as in Fig. 2 as regards the general circuits; but the operating spindles or screws 7ª 7ᵇ of said switches are both attached to the armature 11 of a common operating-motor, which operates the said switches simultaneously and correspondingly. This motor is controlled by a relay 12, connected across the translating-circuit, so as to be responsive to the electromotive force of that circuit at the point or place of consumption. The armature 13 of this relay coöperates with contacts 15 15', connected by circuits 16 16' with the motor aforesaid, the armature thereof being driven in one direction or the other, according to which of these contacts is closed. For reversing the motor either the armature or the field may be reversed. I have shown a field-reversing arrangement, the field-magnet of the motor having two coils 14 14' connected through spring-switches 17 17' with the contacts 15 15', the other side of these coils being connected by wire 18 through the armature with the other side of the circuit. The armature 13 is under normal conditions of electromotive force held out of contact with both contacts 14 14' by the opposing action of magnet 12 and a spring 12'. If the load increases, causing voltage to drop, the spring 12ª will draw the armature 13 to contact 15, and a current impulse will pass from main circuit 4 by wire 18 through armature 11 and field-coil 14', switch 17, circuit 16, contact 15, relay-armature 13, and a wire 19 with the other side 4' of the main circuit. The armature 11 is then rotated by this current until it has moved the switch-contacts 6 6' sufficiently to restore the proper electromotive-force conditions on the consumption-circuit, whereupon the armature 13 resumes its open position. On reverse conditions an inverse action occurs. When the switch device 6 reaches either end of its path of movement, its lug 6ª strikes the tail 17ª of one of the switches 17 17' and opens the switch, thereby preventing further operation of the motor in that direction. Transfer-switches 9 9' are shown for interchanging the connections of the batteries 2 2' from the charging to the discharging connection.

While I prefer to divide the resistance, as shown, it may be sufficient for some purposes to put all the resistance on one side of the circuit, the place of the other part of the resistance being taken by a plain contact-bar, so that when the switch is over to one side, so as to cut out all the resistance, the batteries will be left in direct connection without interposed resistance.

While I have illustrated my system as being equipped with only two storage batteries, it will be apparent that any convenient number of storage batteries may be used, the resistances from each being connected to the consumption-circuit in the same way as in the system shown.

Having thus described my invention, the following is what I claim as new therein and desire to secure by Letters Patent:

1. A system of electrical distribution comprising a plurality of storage batteries, a generator and a consumption-circuit, a divided resistance between the batteries and the consumption-circuit, a switch device variably connecting the consumption-circuit to the said resistance so as to regulate the electromotive force in said circuit, said divided resistance and switch device being adapted and arranged to vary the resistance in the connection from the consumption-circuit to each of the batteries simultaneously and in like manner.

2. A system of distribution comprising a charging-circuit, two storage batteries connected thereto in parallel, a consumption-circuit and a rheostatic device comprising a divided resistance interposed between one of said batteries and said charging-circuit, and a switch device coöperating with both parts of the divided resistance and varying the amount of resistance included on each side simultaneously and in like manner.

3. A system of distribution comprising a charging-circuit, two storage batteries connected thereto in parallel, a consumption-circuit, a divided resistance connected between the batteries and a switch device coöperating with both parts of said resistance varying the amount of resistance included in both parts simultaneously and in like manner, and connecting the consumption-circuit with variable points of such resistance, and an adjustable resistance in the connection to said consumption-circuit.

4. A system of distribution comprising a charging-circuit, two storage batteries connected thereto in parallel, a divided resistance included between the charging-circuit and one of said storage batteries, a consumption-circuit and a resistance in the connection to said circuit, and an adjustable rheostatic switch device coöperating with all of said resistances to vary the point of connection of the consumption-circuit to the first-named resistance and to vary the amount of resistance from this point of connection to the consumption-circuit, the connection from the charging-circuit and from this battery to the two parts of the divided resistance being made at the same end of the rheostatic switch device whereby the resistance is varied simultaneously and in like manner in such two parts.

5. A system of distribution comprising a charging-circuit, two storage batteries connected thereto in parallel, a divided resistance interposed between one of said storage batteries and the charging-circuit, one part of said resistance being connected to the charging-circuit and the other part to said battery, a consumption-circuit, and a switch device coöperating with both parts of said resistance to simultaneously and similarly vary the amount of both parts of said resistance included in circuit.

6. A system of distribution comprising a charging-circuit, two storage batteries, a divided resistance interposed between one of said batteries and the charging-circuit, one part of said resistance being connected to the charging-circuit and the other part to said battery, a consumption-circuit, a switch device variably connecting the consumption-circuit to said resistance, and adapted to simultaneously and similarly vary the amount of both parts of said resistance included in circuit, and an electromagnetic means responsive to the electromotive force of the consumption-circuit and controlling the operation of said switch device.

7. A system of distribution comprising a charging-circuit, two storage batteries, a divided resistance interposed between one of said batteries and the charging-circuit, a consumption-circuit, a switch device variably connecting the consumption-circuit to said resistance and adapted to simultaneously and similarly vary the amount of both parts of said resistance included in circuit, an electric motor operating said switch device, and an electromagnetic means responsive to the electromotive force of the consumption-circuit and controlling the operation of said motor.

8. A system of distribution comprising a charging-circuit, two storage batteries, a divided resistance interposed between one of said batteries and the charging-circuit, a consumption-circuit, a switch device variably connecting the consumption-circuit to said resistance, and adapted to simultaneously and similarly vary the amount of both parts of said resistance included in circuit, an electric motor operating said switch device, and an electromagnetic means responsive to the electromotive force of the consumption-circuit and controlling the operation of said motor, said electromagnetic means consisting of a relay connected to the consumption-circuit, and circuits controlled by said relay to operate said motor in opposite directions, and circuit-breaking switches in said circuits operated by said switch device to open the operating-circuit when the switch device reaches either end of its travel.

9. A system of distribution comprising a generator, a pair of storage batteries, a consumption-circuit, a rheostatic switch device connected to said batteries and generator and to said consumption-circuit, and adapted to regulate the amount of resistance included between one of the batteries and the generator, and to cut out said resistance so as to leave the batteries connected without intermediate resistance, and a resistance in the consumption-circuit connected to and controlled by said rheostatic device, simultaneously with and in similar manner to the control of the resistance in the battery connection.

10. A system of electrical distribution comprising a generator, a plurality of storage batteries and a consumption-circuit, a resistance interposed between the consumption-circuit and the storage batteries, said resistance being divided into branches with a branch for each storage battery, an adjustable switch device for said resistance controlling the resistance between the consumption-circuit and each of said batteries simultaneously and in like manner.

11. A system of electrical distribution comprising a generator, a plurality of storage batteries, and a consumption-circuit, a cut-out to disconnect the dynamo from the circuit, a separate resistance interposed between the consumption-circuit and each of the storage batteries, an adjustable switch device varying each of said separate resistances simultaneously to the same degree and in like manner, said resistances and switch device so arranged that when the switch is in the highest-potential position the several storage batteries are connected together without intervening resistance.

12. A system of electrical distribution comprising a charging-circuit, a plurality of storage batteries, a consumption-circuit, and duplicate resistances, one of said resistances at the feed end of the consumption-circuit and the other at the return end of said circuit, each of said resistances being divided with a separate branch to each storage battery, an adjustable switch for each of said duplicate resistances to control the branches thereof simultaneously and in like manner.

13. A system of electrical distribution comprising a charging-circuit, a plurality of storage batteries, a consumption-circuit, and duplicate resistances, one of said resistances at the feed end of the consumption-circuit and the other at the return end of said circuit, each of said resistances being divided with a separate branch to each storage battery, a switch device responsive to the electromotive force of the consumption-circuit to control each of said duplicate resistances and the branches thereof simultaneously and in like manner.

14. A system of electrical distribution comprising a charging-circuit, a plurality of storage batteries, a consumption-circuit, and duplicate resistances, one of said resistances at the feed end of the consumption-circuit and the other at the return end of said circuit, each of said resistances being divided with a separate branch to each storage battery, a switch device controlling each of said duplicate resistances and the branches thereof simultaneously and in like manner, and a motor responsive to the electromotive force of the consumption-circuit to operate said switch device.

15. A system of electrical distribution comprising a charging-circuit, two storage batteries and a consumption-circuit, a resistance between each battery and the consumption-circuit, a switch device controlling said resistances simultaneously and in like manner, and an interchangeable switch for the storage batteries to connect either battery with the charging-circuit or the consumption-circuit.

16. A system of electrical distribution comprising a charging-circuit, two storage batteries and a consumption-circuit, a resistance between each battery and the consumption-circuit, a switch device controlling said resistances simultaneously and in like manner, means responsive to the electromotive force of the consumption-circuit to control said switch, and an interchangeable switch for the storage batteries to connect either battery with the charging-circuit or the consumption-circuit.

17. A system of electrical distribution comprising a charging-circuit, two storage batteries and a consumption-circuit, duplicate resistances between each pole of the batteries and the consumption-circuit, a switch device controlling said resistances simultaneously and in like manner, and an interchangeable switch for the storage batteries to connect either battery with the charging-circuit or the consumption-circuit.

18. A system of electrical distribution comprising a charging-circuit, two storage batteries and a consumption-circuit, duplicate resistances between each pole of the batteries and the consumption-circuit, a switch device controlling said resistances simultaneously and in like manner, means responsive to the electromotive force of the consumption-circuit to control said switch, and an interchangeable switch for the storage-batteries to connect either battery with the charging circuit or the consumption-circuit.

ALBERT S. HUBBARD.

Witnesses:
JOSEPH J. SCHMIDT,
ARTHUR P. KNIGHT.